Nov. 4, 1969  O. E. BROOKS ET AL  3,476,366
GAS LIQUID TRANSFER APPARATUS
Filed Dec. 29, 1966  2 Sheets-Sheet 1
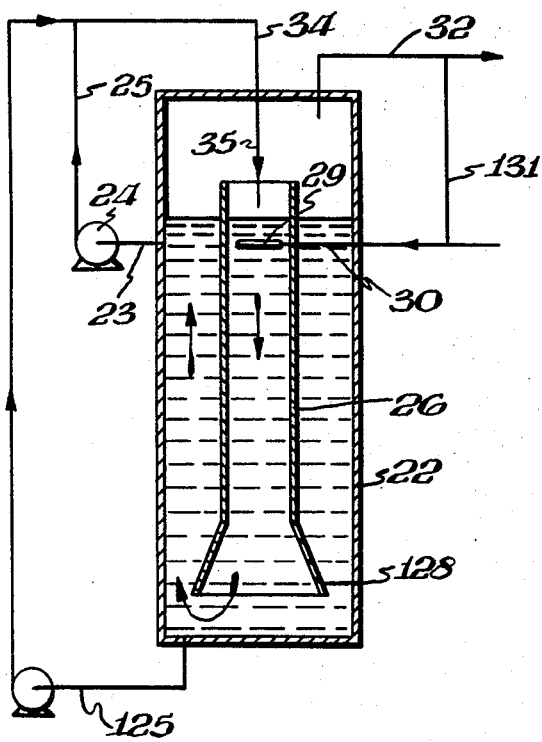
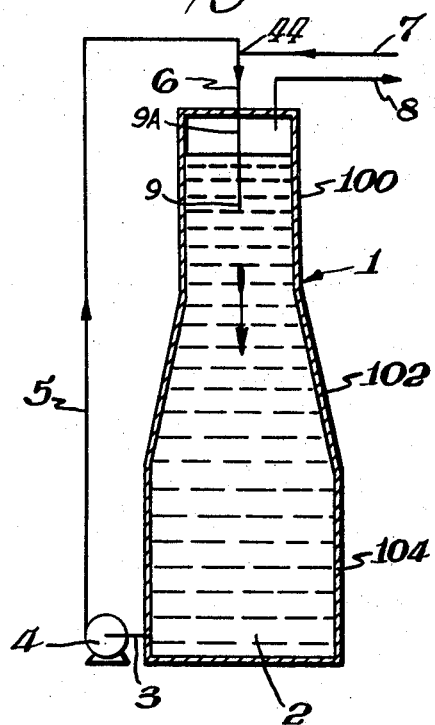

Nov. 4, 1969    O. E. BROOKS ET AL    3,476,366
GAS LIQUID TRANSFER APPARATUS
Filed Dec. 29, 1966
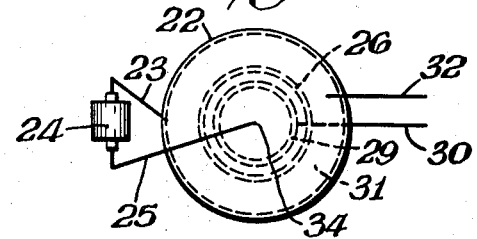
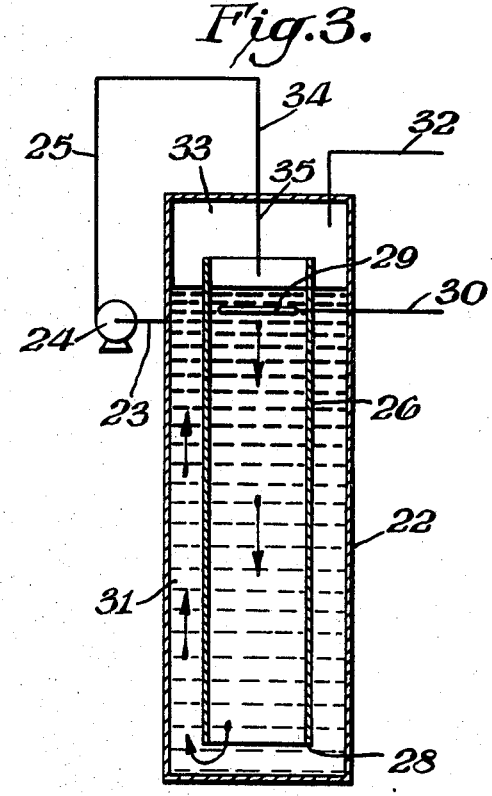

United States Patent Office 3,476,366
Patented Nov. 4, 1969

3,476,366
GAS LIQUID TRANSFER APPARATUS
Owen E. Brooks, Amityville, and Robert C. Nubel, Wantagh, N.Y., assignors to Chas. Pfizer & Co., Inc., New York, N.Y., a corporation of Delaware
Filed Dec. 29, 1966, Ser. No. 605,863
Int. Cl. B01d 47/02
U.S. Cl. 261—36   8 Claims

ABSTRACT OF THE DISCLOSURE

Apparatus for accomplishing contact between incompletely miscible gaseous and liquid phases. An elongated vessel incompletely filled with liquid. Means continuously recycling a stream of liquid contents from the bottom of the vessel and returning the stream to the top of the vessel. Outlet and reintroduction parts accomplishes the removal and reintroduction of the liquid. Aeration means introduces fresh gas into the liquid recycle stream and vent means removes free gas collected in the upper liquid-free portion of the vessel.

---

This invention relates to apparatus for producing mixtures of gases and liquids under conditions suitable for interphase mass transfer.

The requirement that particular chemical components be transferred from one phase to another phase inheres in the occurrence of many chemical reactions and is the basis of several unit operations in chemical engineering including absorption, extraction and distillation. Where a chemical entity is to be transferred from a phase in which it is present in relatively high concentration to a phase in which it is present in relatively low concentration, the final distribution of the chemical entity between the interacting phases is determined by the ultimate utilization of the chemical entity which is being transferred. In the case of simple absorption or extraction, without chemical reaction in the transferee phase, the final concentration after transfer is complete is determined by the equilibrium relationship between the transferor and transferee phases. These equilibria are, in general, attained relatively rapidly and, therefore, relatively short interphase contact times are required to achieve almost complete transfer and a close approach to equilibrium.

On the other hand, where a chemical component is to be involved in a chemical reaction in the transferee phase, the ultimate distribution of the chemical component between the transferor and transferee phases is determined by the extent of the chemical reaction which occurs in the transferee phase. The rate of interphase mass transfer, therefore, will be determined, where there is chemical reaction in the transferee phase, by the rate of the chemical reaction in that phase. Inasmuch as many chemical reactions are relatively sluggish, long interphase contact times may be required to completely consume the needed component which originally was present in the transferor phase and which is to be reacted in the transferee phase. In addition, where the rate of mass transfer dominates the rate of a rapid chemical reaction in the transferee phase, large interfacial surface areas between the phases are required in order to achieve the requisite reaction within a reasonable time period.

To summarize, therefore, relatively short contact times and small interfacial surface areas are required when no chemical reaction is to occur in the transferee phase and a mere change in distribution of a given chemical component is desired. Relatively long contact times between phases are required where a slow chemical reaction is to occur in the transferee phase. Where the intrinsic rate of a chemical reaction is rapid the rate of mass transfer between the phases will control the observed chemical reaction rate and relatively large interfacial areas are advantageous.

An object of this invention is to provide apparatus for contacting gases and liquids which permit efficient utilization of the gases which are contacted with the liquids.

In the drawings:

FIGURE 1 is a schematic diagram of one embodiment of the invention. FIGURE 3 is a schematic drawing of another embodiment of the invention. FIGURE 4 is a top plan view of an embodiment shown in FIGURE 3. FIGURE 2 is a modified form of the embodiment shown in FIGURE 3.

The essence of this invention is the discovery of a simple and economical process for producing intimate mixtures of incompletely miscible liquid and gaseous phases under conditions where intimate, prolonged contact and mass transfer between the phases is effectuated. The new process operates by forming an emulsion of the immiscible phases in a mixing zone after which the natural tendency of the phases to separate due to buoyancy and surface effects is counterbalanced with a drag force produced by flowing the denser phases past suspended separate globules of the other phases. In this manner the emulsion, which is formed in the mixing zone, is then made to persist in a contacting zone where the intimate, prolonged contact and the mass transfer occur. The emulsion will tend to separate in a separation zone from which the recycle is withdrawn to the mixing zone. The recycle will generally consist primarily of the more dense phases.

The operation of our invention is best comprehended by an examination of the forces which affect a bubble of gas or a globule of dissimilar liquid which is suspended in a downward flowing vertical liquid column in which the flowing liquid comprising the bulk of the column is more dense than the gas or liquid which comprises the bubble or globule, as the case may be. First, the bubble is subject to a buoyant force due to the density difference which tends to cause it to rise in the column of flowing liquid. Second, the bubble is subject to a drag force which tends to pull is downward, along with the flowing column of liquid in the direction of flow. The buoyant force is proportional to the bubble volume and the drag force is proportional to the velocity of the liquid column, the outer surface area of the bubble and the surface forces between the bubble and the surrounding liquid. By surface forces is meant the unbalanced molecular forces which contribute to the surface tension of the bubble. Inasmuch as the surface area of the bubble varies as the square of the bubble radius and inasmuch as the volume of the bubble varies as the cube of the bubble radius, a bubble of large radius will be subject to a relatively larger buoyant force and a relatively smaller drag force than a bubble of small radius if the surface forces are supposed equal. Thus, at a given liquid velocity, smaller bubbles will tend to move downward with the liquid more easily since the drag forces will dominate the bubble motion and larger bubbles will tend to move upward in the liquid, against the liquid flow, since the buoyant forces will tend to dominate the bubble motion. Therefore, for each possible liquid velocity which can be used a bubble of some particular size will remain at the same vertical level in the downward flowing column indefinitely.

In this description the less dense phase is indicated as constituting a smaller proportion of the multi-phase mixture than the more dense phase. These proportions are not a necessary aspect of the invention. The proportion of the more dense phase may be smaller than the less dense phase provided that the degree of subdivision of the less dense phase is sufficient to allow discrete portions of the less dense phase to be surrounded by the more dense phase and to allow the buoyant and drag forces to become operative upon these discrete portions.

The general manner in which these competing forces are utilized in our invention may be understood by attention to the schematic diagram of an embodiment of our invention shown in FIGURE 1. In FIGURE 1 the gas-liquid contactor 1 is an elongated vessel. The liquid column 2 flows downward in the direction of the arrow. The liquid and some gas are drawn off at the bottom of the vessel 1 through a tube 3 and are fed to the top of the vessel by a recirculation pump 4, through a recirculation line 5. The recirculating stream of liquid and gas re-enters the vessel 1 through a re-introduction port 6 at the top of the vessel. The liquid flow from top to bottom is thus established by these recirculation means. Fresh gases are mixed with the liquid stream through the gas inlet port 7 and spent gases may be vented from the vessel through the gas vent 8. The mixture of fresh gas, liquid and some recirculated gas is created at the impingement point 44 of the gas inlet port 7. The turbulence present at this point causes the gas to become intimately mixed with the liquid in the form of small bubbles. It is in this form that the two-phase mixture of liquid and gas reaches the main body of the downward flowing liquid at the outlet point 9 of the liquid re-introduction port 6. The turbulence which existed at the gas impingement point 44 will cause a large number of gas bubble to be formed in the mixture which enters the downward flowing liquid at the outlet point 9 of the re-introduction port 6. In this embodiment of our invention, therefore, the mixing zone extends from the impingement point 44 of the gas inlet port 7 to the portion of the moving column of liquid 2 adjacent to outlet point 9 of the liquid re-introduction port 6; most of the remainder of the moving liquid column 2 is the contacting zone and the separation zone is the lowest part of the moving liquid column 2 adjacent to the tube 3.

These entrained gas bubbles will vary in size although a large portion of the bubbles will be of relatively small size. From the analysis given above, it may be seen that the relatively large bubbles, which will be present when the stream of fresh gas and recirculated liquid first reaches the main body of liquid, will be under the domination of upward buoyant forces and will rapidly rise from the point of introduction 9 into the gas space 10 above the liquid level. The contents of these larger bubbles will thus reach the gas vent 8 almost immediately after their introduction into the body of flowing liquid. Contrarily, the motion of the smaller bubbles will be dominated by the downward drag forces created by the liquid surrounding them and they will be swept downward, under the influence of these drag forces, into the contacting zone within the main body of the flowing liquid.

In this manner, our invention makes it possible for a large proportion of the flowing mass of liquid to be exposed to small bubbles of gas which take up a relatively small volume, provide the surface area for more efficient and rapid mass transfer of the gas into the liquid and remain in the vessel for extended periods of time during which mass transfer can occur. Soon after start-up most of the vessel becomes filled with an intimate mixture of gas and liquid. Some of the bubbles which initially move downward from the mixing zone near the outlet point 9 under the net influence of the drag forces will reach the separation zone and the liquid draw-off port 3 and be recycled with the liquid. The remainder of the bubbles will form into larger bubbles by successive collision with other bubbles in the contacting zone and will, consequently, be overcome by the buoyant force upon them and rise slowly to the upper surface of the liquid and be exhausted from the vent 8. A small portion of the bubbles, upon which the drag and buoyant forces are balanced will remain stationary, in the vertical direction, until their size is changed due to collision.

The extended gas-liquid contact time, which is made possible by this invention, is much longer than that which is easily attainable by the use of older methods for contacting gases and liquids in which the gas and liquid are caused to flow in opposite directions. In addition, older methods for gas-liquid contact often require the gas to be pumped into the liquid against the head of liquid in the vessel. The compression costs occasioned by this mode of pumping and contacting are greater than the pumping costs required for recirculating the liquid in the novel apparatus of this invention. Furthermore, the degree of agitation which is occasioned by the mode of gas-liquid contact of this invention is more complete than that occasioned by the older methods of introducing the gas into the liquid. Finally, this method of gas-liquid contacting avoids excessive foaming at the upper surface of the liquid. This advantage is especially important in fermentation or other processes which involve viscous liquids or liquids which foam easily.

As indicated in FIGURE 1 the vessel includes an upper parallel-sided elongated section 100, an outwardly tapered intermediate portion 102, and a lower parallel-sided section 104.

Another embodiment of our invention is depicted in FIGURE 3. The mode of operation of the apparatus of FIGURE 3 is similar in many respect, to the mode of operation of the apparatus depicted in FIGURE 1. The apparatus of FIGURE 3 is especially useful in operations, such as fermentation, where provision must be made for the effective release of the waste gases produced by the chemical reaction in the liquid phase. In addition, this apparatus is useful in processes where release of absorbed gas from the liquid phase must be accomplished with effectiveness. Other mass transfer processes may also be effectively carried out in the apparatus depicted in FIGURE 3.

The apparatus of FIGURE 3 consists of a cylindrical vessel 22 which contains within it an open-ended cylindrical tube 26 of a smaller diameter. The upper end of the cylindrical tube 26 protrudes from the upper surface of the moving liquid and the lower end of the tube 26 extends downward close to the bottom of the vessel 22. A vessel with a conical lower end may be used as the vessel 22 in the embodiment depicted in FIGURE 3. Where such a vessel is used the inner, open-ended cylindrical tube may also be provided with a conical lower end whose sides are substantially parallel to the contours of the conical lower end of the outer vessel. Recycle means are provided in the apparatus depicted in FIGURE 3 by the use of a draw-off line 23 which is located near, but below, the upper surface of the moving body of liquid in the apparatus. A pump 24 forces the liquid from the draw-off line 23 into the recycle line 25 and into the liquid re-introduction line 34. From the outlet point 35 of the liquid reintroduction line 34 the liquid is splashed onto the upper surface of the moving body of liquid. The outlet point 35 of the liquid re-introduction port 34 is set near the upper end of the open-ended cylindrical tube 26 so that the liquid issuing from the outlet point 35 splashes onto the portion of the upper surface of the moving body of the liquid which is contained within the cylindrical tube 26. By arranging the recycle means in this manner a flow of liquid is set up within the contactor 22 as shown by the arrows in FIGURE 3. Thus, the liquid contained within the cylindrical tube 26 flows downward, around the edge 28 of the open-ended cylinder 26 and upward in the annular space 31 between the outer surface of the cylindrical tube 26 and the inner surface of the wall of the contactor 22. The flowing stream continues upward in the annuar space 31 until it reaches the draw-off line 23.

Gases are provided to the liquid in the contactor 22 by means of a gas inlet port 30 which is connected to a distributor ring 29. The distributor ring 29 is provided as a means for dispersing the gases more widely within the liquid volume which is close to the upper surface of the moving body of liquid and contained within the cylindrical tube 26. The distributor ring 29 is provided with a larger number of small holes through which air or another gas may be dispersed into the liquid. The small holes insure the formation of a large number of small bubbles of gas within the moving body of liquid. These small bubbles of gas are entrapped within the liquid and are carried downward by the resultant drag force upon them according to the mechanism which has been described in connection with the operation of the apparatus of FIGURE 1. Some of the larger bubbles will, of course, experience a resultant buoyant force and rise through the small liquid volume above the distributor ring 29 and be discharged into the liquid-free space 33 above the main body of moving liquid. The gas which is discharged into the liquid-free space 33 is discharged through the vent 32. The bubbles which are entrained within the liquid after being formed at the distributor ring 29 are carried downward within the moving liquid to form an intimate mixture of gas and liquid. The mixture provides the opportunity for efficient and rapid mass transfer between the phases, as has been described above.

Upon collision with other bottles of gas, the small bubbles may become enlarged into larger ones. Some of these larger bubbles may become subject to a resultant buoyant force upon them and will not be carried along downward with the liquid in the tube 26, but will be buoyed upward to the upper liquid surface and discharged into the liquid-free space 33. Thus, only the smaller bubbles which are not enlarged by collision are carried by the moving stream past the edge 28 of the cylindrical tube 26 and are carried upward in the annular space 31. These bubbles are discharged into the liquid-free space 33 at the upper surface of the liquid outside the cylindrical tube 26 or are carried into the draw-off tube 23, together with the liquid.

FIGURE 2 shows a modified form of the arrangement illustrated in FIGURE 3. As indicated therein, this modified form includes line 131 for adding a portion of the vented gas from line 32 into the fresh gas of line 30. A suitable aspirator may also be disposed in distributor 29. Additionally further recycling may be obtained by means 125 for eventually directing the stream into tube 26 which terminates in an outwardly tapered portion 128.

We claim:

1. Apparatus for accomplishing intimate prolonged contact between incompletely miscible gaseous and liquid phases which comprises a hollow vertically elongated vessel which is incompletely filled with liquid and which is closed at its upper and lower ends and within which is coaxially situated a cylindrical tube which is open at both ends; said open-ended cylindrical tube being situated so that its upper end is above the liquid level in said elongated vessel and so that its lower end is separated from the bottom of said vertically elongated cylindrical vessel; said open-ended cylindrical tube dividing the vessel into a volume within the open-ended cylindrical tube, an annular volume located between the outer surface of the said open-ended cylindrical tube and the inner surface of the vessel and a volume located below the lower end of said open-ended cylindrical tube; recycle means for continually withdrawing a stream of liquid contents from the uppermost portion of the annular volume and recycling a first stream to the uppermost portion of the volume contained within the open cylindrical tube; outlet and reintroduction ports for accomplishing said recycle; aeration means for introducing bubbles of fresh gas into the liquid volume in said open-ended cylindrical tube; said aeration means being positioned below the reintroducton point of the recycling stream into the liquid volume in said open-ended cylindrical tube; vent means for removing free gas which is collected in the uppermost liquid-free portion of said vessel.

2. Apparatus as claimed in claim 1 wherein means recycling a second stream from the bottom of said vertically elongated vessel and means combining said second stream with said first stream prior to the re-introduction of said first recycle stream into the volume of liquid in said open-ended cylindrical tube.

3. Apparatus as claimed in claim 1 including combining means for adding a portion of said vented gas to said fresh gas.

4. Apparatus as claimed in claim 1 wherein said aeration means is a means of adding gas to said liquid by use of a gas distribution device located within and close to the upper surface of the liquid volume within said open-ended cylindrical tube.

5. Apparatus as claimed in claim 4 wherein said distribution means is a distribution ring.

6. An apparatus as described in claim 1 wherein the lower portion of said open-ended cylindrical tube is outwardly tapered.

7. Apparatus for accomplishing interphase mass transfer between gaseous and liquid phases which comprises a hollow vertical elongated vessel which is incompletely filled with liquid, recycle means for continuously withdrawing a stream of liquid contents from the bottom of said vessel and re-introducing said stream into the top of said vessel; outlet and reintroduction ports for accomplishing said removal and reintroduction; aeration means for introducing fresh gas into said liquid recycle stream, and vent means for removing free gas collected in the upper liquid-free portion of said vessel; the upper portion of said vessel being a parallel-sided elongated section; the intermediate portion of said vessel being outwardly tapered, the lowest portion of said vessel being a second parallel-sided section with a diameter substantially equal to the largest diameter of the outwardly tapered portion of said vessel; said recycle means being connected to remove liquid from the lowest part of said second parallel-sided section.

8. Apparatus for accomplishing intimate prolonged contact between incompletely miscible gaseous and liquid phases which comprises a hollow vertically elongated vessel which is incompletely filled with liquid and which is closed at its upper and lower ends and within which is coaxially situated a cylindrical tube which is open at both ends; said open-ended cylindrical tube being situated so that its upper end is above the liquid level in said elongated vessel and so that its lower end is separated from the bottom of said vertically elongated cylindrical vessel; said open-ended cylindrical tube dividing the vessel into a volume within the open-ended cylindrical tube, an annular volume located between the outer surface of the said open-ended cylindrical tube and the inner surface of the vessel and a volume located below the lower end of said open-ended cylindrical tube; recycle means for continually withdrawing a stream of liquid contents from the uppermost portion of the annular volume and recycling a first stream to the uppermost portion of the volume contained within the open cylindrical tube; outlet and reintroduction ports for accomplishing said recycle; aeration means connected to said recycle means for introducing bubbles of fresh gas into the liquid volume in said open-ended cylindrical tube; said aeration means including means for introducing gas into said recycle stream by aspiration; and vent means for removing free gas which is collected in the uppermost liquid-free portion of said vessel.

References Cited

UNITED STATES PATENTS

| | | | |
|---|---|---|---|
| 1,868,775 | 7/1932 | Stratford | 210—197 X |
| 2,123,463 | 7/1938 | Effront. | |
| 523,501 | 7/1894 | Adam et al. | 261—36 |
| 642,460 | 1/1900 | Kersten | 195—142 XR |
| 2,338,228 | 1/1944 | Boeckeler et al | 195—109 XR |

FOREIGN PATENTS

| | | |
|---|---|---|
| 236,892 | 11/1964 | Austria. |
| 308,254 | 6/1930 | Great Britain. |

RONALD R. WEAVER, Primary Examiner

U.S. Cl. X.R.

23—271; 195—142; 209—170; 261—123